United States Patent [19]
Olstowski

[11] Patent Number: 5,461,790
[45] Date of Patent: Oct. 31, 1995

[54] CIRCULAR SAWS WITH LASER GUIDES FOR MORE PRECISE MOVEMENT DURING CUTTING

[76] Inventor: Franek Olstowski, 4010 Cedar Gardens, Houston, Tex. 77082

[21] Appl. No.: 197,331

[22] Filed: Feb. 16, 1994

[51] Int. Cl.⁶ .................................................. B23D 47/00
[52] U.S. Cl. ............................... 30/391; 30/390; 362/119
[58] Field of Search ............................. 30/123, 388–391; 362/110, 119

[56] References Cited

U.S. PATENT DOCUMENTS 4,589,208  5/1986  Iwasaki et al. ............................ 30/391

FOREIGN PATENT DOCUMENTS 3922849  1/1991  Germany ................................. 30/390

Primary Examiner—Douglas D. Watts

[57] ABSTRACT

A circular saw for more precise movement during cutting comprising a circular blade with a peripheral edge having teeth and a power source to rotate the blade about its axis; a shield covering at least a portion of the blade to protect a user from the peripheral teeth of the blade; a blade plate positionable on the work piece to be cut with an elongated aperture for the passage therethrough of the blade, the blade plate having a notch at its leading edge in alignment with the plane of the blade; a laser device positioned on the shield to project a laser beam in a line from the notch along the workpiece to a line along the direction to be cut; means to power the laser with a visible light; and an optical element to fan the laser beam onto the workpiece in a line within the blade plane and intended direction of blade movement with an angular divergance between about thirty and sixty degrees.

3 Claims, 3 Drawing Sheets

CIRCULAR SAWS WITH LASER GUIDES FOR MORE PRECISE MOVEMENT DURING CUTTING

BACKGROUND OF THE INVENTION

Field of the Invention

The present invention relates to a circular saw with a laser guide for more precise movement during cutting and more particularly pertains to cutting material with a circular saw through the utilization of a diode or other type laser to effect a more precise movement during cutting.

Description of the Prior Art

The use of electric saws is known in the prior art. More specifically, electric saws heretofore devised and utilized for the purpose of cutting material with a saw in a straight line are known to consist basically of familiar, expected, and obvious structural configurations, notwithstanding the myriad of designs encompassed by the crowded prior art which has been developed for the fulfillment of countless objectives and requirements.

The prior art discloses a large number of electric saws. By way of example, U.S. Pat. No. 4,564,736 to Jones discloses an industrial hand-held laser tool and laser system.

U.S. Pat. No. 4,752,156 to Owens discloses a laser-guided portable screed.

U.S. Pat. No. 4,832,782 to Angell discloses a vacuum ring for producing laminated glass.

U.S. Pat. No. 4,885,967 to Bell discloses a laser alignment device for sawmills.

Lastly, U.S. Pat. No. 5,114,487 to Hersey discloses a portable laser device for alignment tasks.

In this respect, circular saws with laser guides for more precise movement during cutting according to the present invention substantially depart from the conventional concepts and designs of the prior art, and in doing so provide an apparatus primarily developed for the purpose of cutting material with a circular saw through the utilization of a laser to effect a more precise movement during cutting.

Therefore, it can be appreciated that there exists a continuing need for new and improved circular saws with laser guides for more precise movement during cutting which can be used for cutting material with a circular saw through the utilization of a laser to effect a more precise movement during cutting. In this regard, the present invention substantially fulfills this need.

SUMMARY OF THE INVENTION

In view of the foregoing disadvantages inherent in the known types of electric saws now present in the prior art, the present invention provides improved circular saws with laser guides for more precise movement during cutting. As such, the general purpose of the present invention, which will be described subsequently in greater detail, is to provide new and improved circular saws with laser guides for more precise movement during cutting and methods which have all the advantages of the prior art and none of the disadvantages.

To attain this, the present invention essentially comprises a new and improved circular saw with a laser guide for more precise movement during cutting comprising, in combination, a circular blade with a peripheral edge having teeth and a power source to rotate the blade about its axis. A shield covering at least a portion of the blade protects a user from the peripheral teeth of the blade. A blade plate is positionable on the work piece to be cut with an elongated aperture for the passage therethrough of the blade, the blade plate having a notch at its leading edge in alignment with the plane of the blade. A laser device is positioned on the shield to project a laser beam in a line from the notch along the workpiece to a line within the blade plane along the direction to be cut. Means are provided to power the laser device with a 630 to 670 nanometer wavelength at a two-to-five milliwatt power. An optical element fans the laser beam onto the workpiece in a line into the intended direction of blade movement with angular divergence between about thirty and sixty degrees. First support means couple the laser device to the shield, the first support means including a dovetail coupling with locking means to move the laser device toward and away from the workpiece. Slots in the dovetail coupling are provided to allow alignment within the blade plane. Another locking means is provided to allow rotational adjustment of the laser/line generating optic assembly. Additional support means couple the first support means and the laser device, the second support means including a disk with locking means to vary the angular orientation of the laser device with respect to the shield.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. (i.e. fixed position mounting.) Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved circular saws with laser guides for more precise movement during cutting which have all the advantages of the prior art electric saws and none of the disadvantages.

It is another object of the present invention to provide new and improved circular saws with laser guides for more precise movement during cutting which may be easily and efficiently manufactured and marketed.

It is a further object of the present invention to provide new and improved circular saws with laser guides for more precise movement during cutting which are of a durable and reliable construction.

An even further object of the present invention is to provide new and improved circular saws with laser guides for more precise movement during cutting which are susceptible of a low cost of manufacture with regard to both materials and labor, and which accordingly are then susceptible of low prices of sale to the consuming public, thereby making such circular saws with laser guides for more precise movement during cutting economically available to the buying public.

Still yet another object of the present invention is to provide new and improved circular saws with laser guides for more precise movement during cutting which provide in the apparatuses and methods of the prior art some of the advantages thereof, while simultaneously overcoming some of the disadvantages normally associated therewith.

Even still another object of the present invention is to cut material with a circular saw through the utilization of a laser to effect a more precise movement during cutting.

Lastly, it is an object of the present invention to provide a circular saw for more precise movement during cutting comprising a circular blade with a peripheral edge having teeth and a power source to rotate the blade about its axis; a shield covering at least a portion of the blade to protect a user from the peripheral teeth of the blade; a blade plate positionable on the work piece to be cut with an elongated aperture for the passage therethrough of the blade, the blade plate having a notch at its leading edge in alignment with the plane of the blade; a laser device positioned on or housed within the shield to project a laser beam in a line from the notch along the workpiece to a line along the direction to be cut; means to power the laser with a visible light; and an optical element to fan the laser beam onto the workpiece in a line within the blade plane and intended direction of blade movement with an angular divergence between about thirty and sixty degrees.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
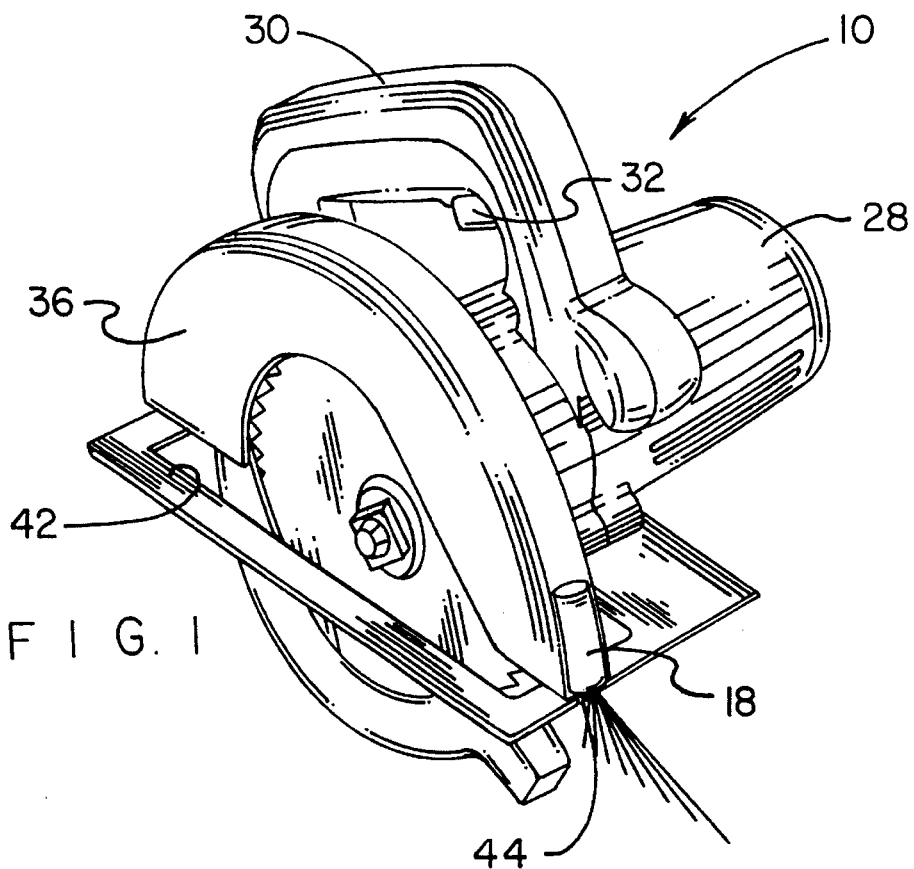
FIG. 1 is a perspective view of the preferred embodiment of the circular saw with a laser guide for more precise movement during cutting constructed in accordance with the principles of the present invention.

With reference now to the drawings, and in particular to FIGS. 1 through 6 thereof, the preferred embodiment of the new and improved circular saw with laser guide for more precise movement during cutting embodying the principles and concepts of the present invention and generally designated by the reference numeral 10 will be described.

The present invention, in its broadest context, is in a circular saw 10. The circular saw includes the blade 12, the shield 14, the blade plate 16, and a laser device 18.

More specifically, the saw 10 has for its primary component a circular blade 12. The blade has a peripheral edge 22 with cutting teeth 24. When the blade is rotated about its axis, the teeth are rotated and will act to cut any workpiece 26 which is contacted by the rotating blade. In addition to the blade 12, the saw 10 includes a housing 28 with a motor, not shown, therein. The housing also has a handle 30 for being held by an operator with a trigger 32 coupled to the motor for stopping and starting the rotation of the blade.

Figure 2:
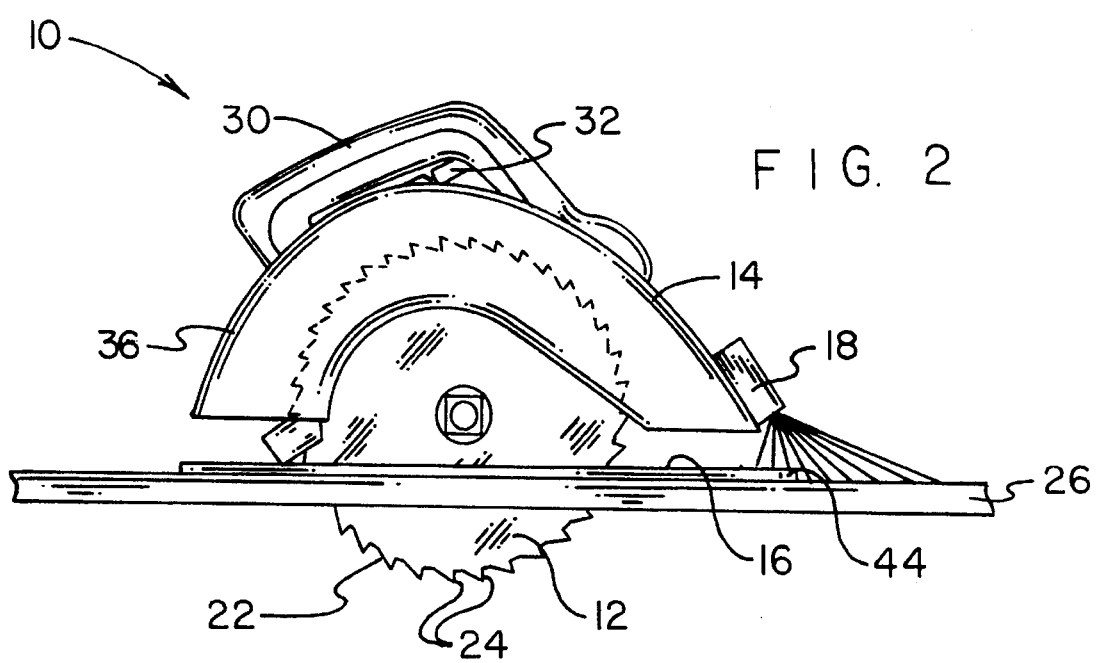
FIG. 2 is a side elevational view of the device shown in FIG. 1.

For safety purposes, the blade is covered with a shield 14. The shield surrounds the serrations of the blade to preclude the user from cutting himself or herself during operation and use. The upper shield 36 is fixedly positioned with respect to the rotating blade. It is located above the workpiece to be cut. The shield also includes a lower shield component 38. The lower shield component covers the lower extent of the blade which is normally beneath the workpiece during operation and use. The lower shield component is rotatable when not in use from the position as shown in FIG. 1 wherein the user is protected to an operative position as shown in FIG. 2 wherein the lower shield component is located within the upper shield 36. This exposes the blade during operation and use while the blade is rotating to cut the workpiece.

The next component of the saw 10 is the blade plate 16. The blade plate includes a lower planar surface adapted to ride on the workpiece 26 while the workpiece is being cut. The blade plate 16 has an elongated aperture 42 through the center thereof for the passage of the blade during cutting. The aperture is sufficient size as to allow the positioning therein of the lower shield section 38 when the saw is not in use.

Located at the front edge of the plate is a notch 44. The notch is in vertical alignment with the plane of the blade. In this manner, the user may keep his eye on the line of the workpiece where the cut is to be made as well as the notch. By moving the notch 44 along the line of the workpiece to be cut, the blade will follow in a line wherein the cut is intended to be made.

Located on the shield 14 is a laser device 18. The laser device is provided with a light source 46 positioned to project a beam downwardly and forwardly along the line of the workpiece where it is intended to cut. Consequently, the laser beam is adapted to be in alignment with the plane of the blade as well as the notch of the blade plate. A power source 48 is provided in the laser device. The power source is such as to project a beam in the visible spectrum at between about 630 and 670 nanometers in wavelength within the visible spectrum. Such power source is also adapted to function at between about two and five milliwatts of optical power, a safe level for normal use.

In association with the light source is an optical device 50 in the nature of a concave cylindrical lens with a negative focal length. The lens is adapted to fan the beam from the laser in a line corresponded to the intended direction of blade movement and cut. The optical device is adapted to therefore fan the beam at between about thirty and sixty degrees from the central axis of the beam. Other appropriate optical devices, as for example, a binary optical element, for effecting a more uniform intensity fanning of the light beam from the laser could readily be utilized as is known in the optical arts. Another binary optical device that may be preferred is one which generates any odd number of equal intensity beams in a fanned configuration. Instead of a continious line, this device would project beams in a fanned configuration displaying multiple points on the workpiece. This would yield increased visibility of the cut mark as it could be viewed in normal light between brighter laser lit points along this line.

Figure 3:
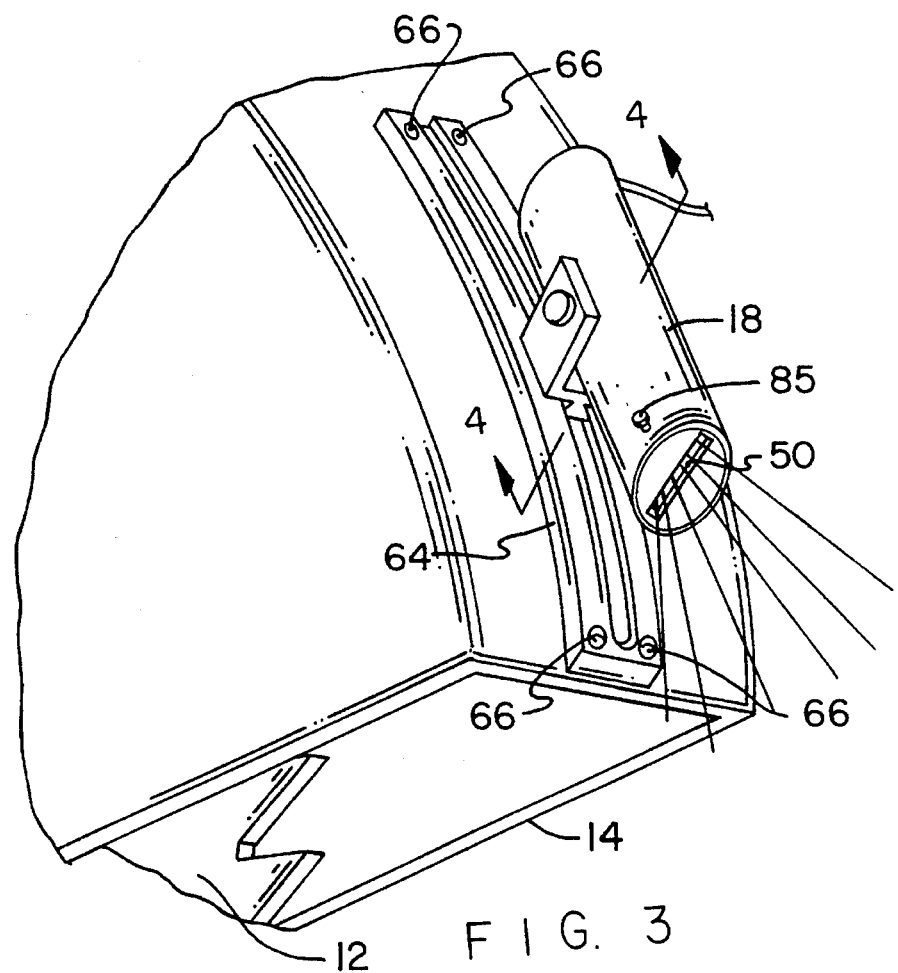
FIG. 3 is an enlarged perspective view of the laser device constructed in accordance with an alternate embodiment of the invention.
Figure 4:
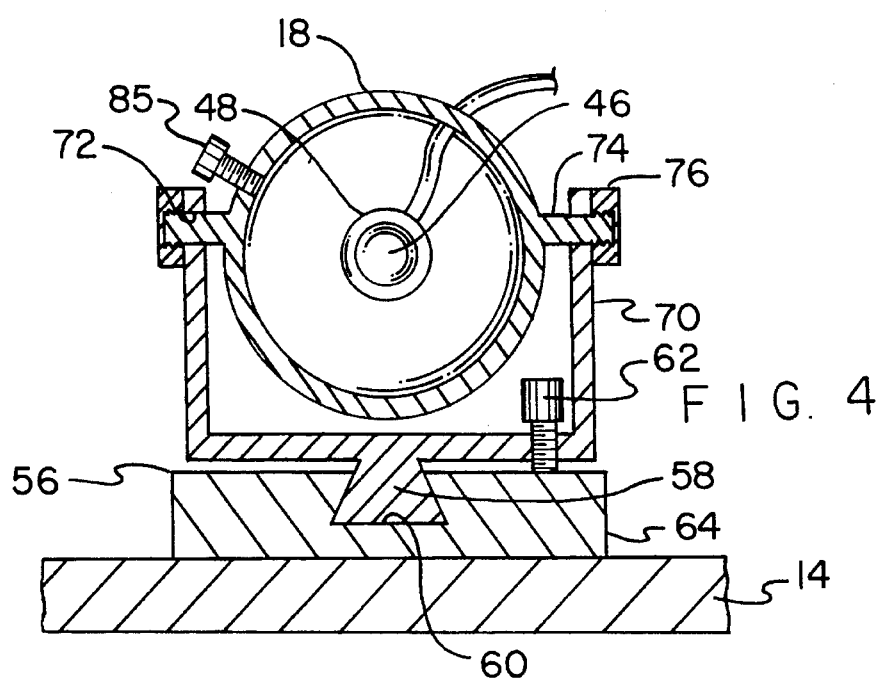
FIG. 4 is a cross-sectional view of the laser beam taken along line 4—4 of FIG. 3.

Shown in FIGS. 3 and 4 is a first support means 56. Such first support means is for coupling the housing 18 with the shield 14. Such support means includes a dovetail projection 58 adapted to ride in a dovetail groove 60 of a corresponding size and configuration. In association therewith is a locking pin 62 adapted to retain the dovetail projection and laser device in its preset orientation for a particular application. The dovetail groove 60 is formed in a housing 64. Such housing is curved to conform with the curvature of the exterior surface of the shield to which it is permanently coupled as through screws 66. In this manner, the laser device 10 may be moved upwardly or downwardly with respect to the housing 64 and shield 36 to vary the location of the fanned laser light to a greater or lesser extent along the line of the workpiece to be cut.

In association therewith, a bracket 70 with apertures 72 supports the laser device to the dovetail projection 58. The apertures 72 of the housing receive threaded rods 74 with threaded nuts 76 thereover. Such an arrangement allows for angular reorientation of the laser device and its beam without its movement with respect to the shield. A setscrew 85 allows rotational alignment of laser line generating device to be locked and maintained within blade plane.

Figure 5:
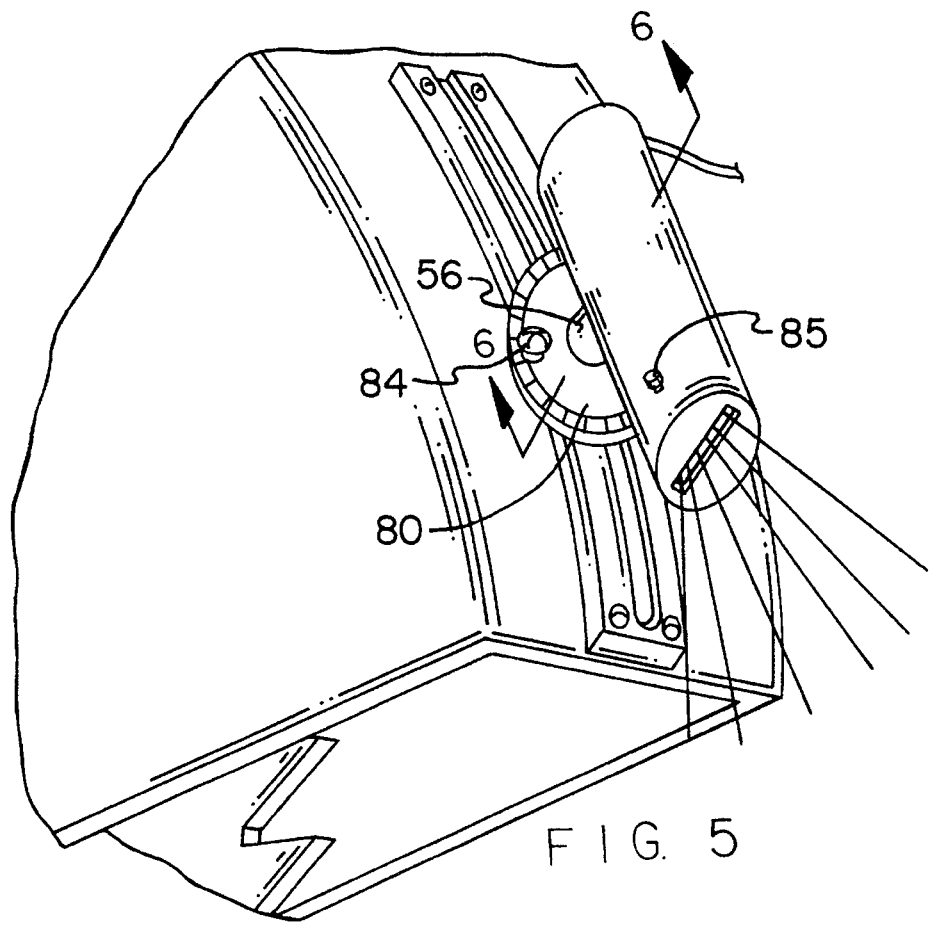
FIG. 5 is a perspective illustration of a laser device constructed in accordance with another alternate embodiment of the invention.
Figure 6:
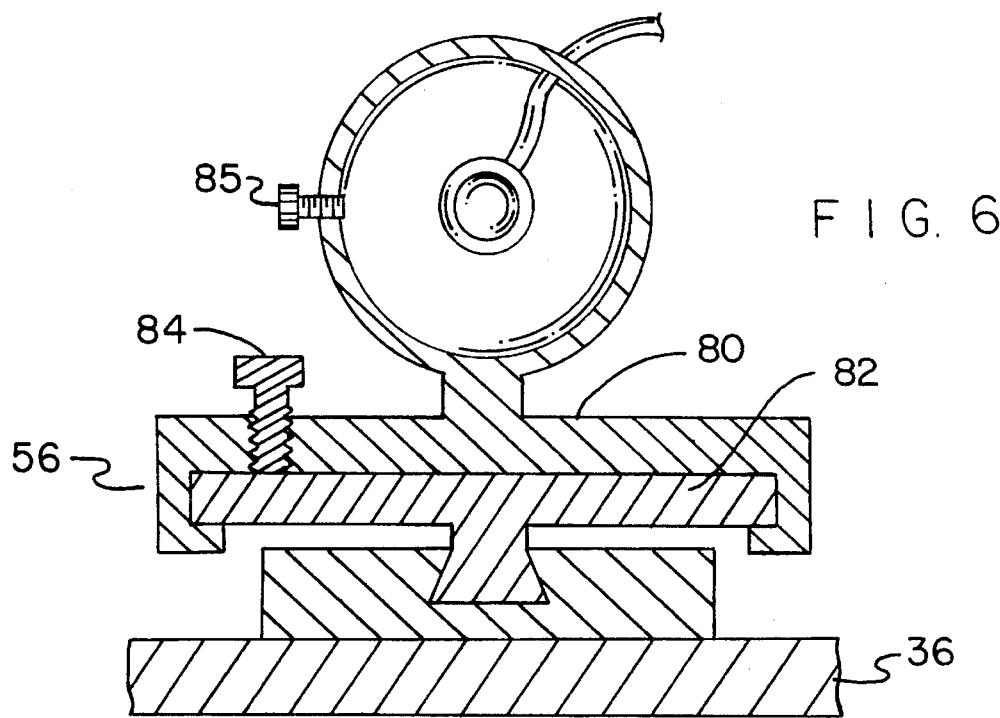
FIG. 6 is a cross-sectional view of the laser beam and coupling taken along line 6—6 of FIG. 5.

The last embodiment of the invention is shown in FIGS. 5 and 6. In such embodiment, an upper external disk 80 and a lower interior disk 82 are rotatably coupled with respect to each other. A tightening bolt 84 extends through an aperture in the upper disk to secure the lower disk with respect thereto when tightened. When loosened, the upper disk may rotate with respect to the lower disk to vary the angular orientation of the laser device and its beam to one side of the intended cut or the other. Such an arrangement allows for intentionally cutting off-set during use from its original intended orientation.

This invention uses a standard visible-wavelength diode laser, for example, 630 to 670 nanometer, of low, non- hazardous power such as a Class II or Class IIIa which is directed through a line-generating or multiple beam optical element to illuminate the intended path of the circular saw blade. The optical element can be a concave cylindrical lens with a negative focal length, but would work as well if not better if a binary optical element, or binary line generating element or a multiple beam splitter binary optical element were used. Binary optic line generators have more consistency of laser intensity across the fan angle. A multiple beam line generating element could further enhance visibility of cut mark since laser pattern on material to be cut would resemble a laser lit dotted line.

The fanned laser beam creates a line which would be mounted on the same plane as the saw blade and directed just in front of the intended saw path. This illuminated line would be guided over the marked line to allow better precision and control of the cut. Angular deviations are more easily recognized over conventionally used methods. The cutting angle would not effect the saw vs. laser position, nor would cutting depth.

Typically on a circular saw there are two notches made in the base plate, one close to the blade and one slightly in front approximately two to three inches. Sometimes there is only the notch in front and the saw blade itself is used as the rear marker to align the saw before the cut is initiated. One has to bend forward to look over the top of the saw to see this alignment and carefully adjust before starting. A slight deviation from this angle can get the saw started incorrectly or allows the path of the saw to easily stray.

The laser line in front gives the user an easier and more accurate start, as well as a more precise cut because these small deviations are exaggerated due to increasing offset with distance from blade. The laser could be housed or mounted to the blade cover or housing and could be wired into the saw trigger to come on when the blade begins turning. Cutting time and subsequent labor costs might also be saved if an individual cuts wood or other material frequently such as in construction or manufacturing.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved circular saw with a laser guide for more precise movement during cutting comprising, in combination:

a circular blade with a peripheral edge having teeth and a power source to rotate the blade about its axis;

a shield covering at least a portion of the blade to protect a user from the peripheral teeth of the blade;

a blade plate positionable on the work piece to be cut with an elongated aperture for the passage therethrough of the blade, the blade plate having a notch at its leading edge in alignment with the plane of the blade;

a laser device positioned on the shield to project a laser beam in a line from the notch along the workpiece to a line along the direction to be cut;

means to power the laser device with a 630 to 670 nanometer wavelength at a two-to-five milliwatt power rating;

an optical element to fan the laser beam onto the workpiece in a line within the blade plane and into the intended direction of blade movement at an angular divergence between about thirty and sixty degrees;

first support means coupling the laser device to the shield, the first support means including a dovetail coupling with locking means to move the laser device toward and away from the workpiece; and additional support means coupling the first support means and the laser device, the second support means including a disk with locking means to vary the angular orientation of the laser device with respect to the shield.

2. A circular saw for more precise movement during cutting comprising:

a circular blade with a peripheral edge having teeth and a power source to rotate the blade about its axis;

a shield covering at least a portion of the blade to protect a user from the peripheral teeth of the blade;

a blade plate positionable on the work piece to be cut with an elongated aperture for the passage therethrough of the blade, the blade plate having a notch at its leading edge in alignment with the plane of the blade;

a laser device positioned on the shield to project a laser beam in a line beginning at the notch along the workpiece in a line along the direction to be cut;

means to power the laser with a visible light;

an optical element to fan the laser beam onto the workpiece in a line within the blade plane and into the intended direction of blade movement at an angular divergence between about thirty and sixty degrees; and first support means coupling the laser device to the shield, the first support means including a dovetail coupling with locking means to move the laser device toward and away from the workpiece.

3. The saw as set forth in claim 2 and further including:

additional support means coupling the first support means and the laser device, the second support means including a disk with locking means to vary the angular orientation of the laser device with respect to the shield.

\* \* \* \* \*